(12) United States Patent
Kitajima

(10) Patent No.: US 11,406,920 B2
(45) Date of Patent: Aug. 9, 2022

(54) FILTER DEVICE

(71) Applicant: YAMASHIN-FILTER CORP., Kanagawa (JP)

(72) Inventor: Nobuyuki Kitajima, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 162 days.

(21) Appl. No.: 16/897,931

(22) Filed: Jun. 10, 2020

(65) Prior Publication Data

US 2020/0298148 A1  Sep. 24, 2020

Related U.S. Application Data

(63) Continuation of application No. PCT/JP2018/046284, filed on Dec. 17, 2018.

(30) Foreign Application Priority Data

Dec. 26, 2017  (JP) .............................. JP2017-250185

(51) Int. Cl.
*G06K 19/07* (2006.01)
*B01D 29/23* (2006.01)
*B01D 35/147* (2006.01)

(52) U.S. Cl.
CPC ....... *B01D 29/232* (2013.01); *B01D 35/1475* (2013.01); *G06K 19/0723* (2013.01); *B01D 2201/0453* (2013.01); *B01D 2201/12* (2013.01); *B01D 2201/295* (2013.01); *B01D 2201/52* (2013.01); *B01D 2201/56* (2013.01)

(58) Field of Classification Search
CPC ........ B01D 2201/0453; B01D 2201/12; B01D 2201/291; B01D 2201/295; B01D 2201/52; B01D 2201/56; B01D 29/21; B01D 29/232; B01D 35/0276; B01D 35/1475; B01D 35/143; B01D 27/101;
(Continued)

(56) References Cited

U.S. PATENT DOCUMENTS 8,449,765 B2 * 5/2013 Kreibig .............. B01D 46/0086
210/85
9,555,351 B2 * 1/2017 Grass .................... B01D 35/153
(Continued)

FOREIGN PATENT DOCUMENTS

CN    105611987 A    5/2016
JP    2005-212356 A  8/2005
(Continued)

OTHER PUBLICATIONS

Office Action dated Aug. 23, 2021 and Search Report dated Aug. 13, 2021, issued in Chinese Patent Application No. 201880075176.X, with English Translation (22 pages).
(Continued)

*Primary Examiner* — Terry K Cecil
(74) *Attorney, Agent, or Firm* — Nakanishi IP Associates, LLC

(57) ABSTRACT

An IC tag is attached to a filter element and a contact of the IC tag with liquid is avoidable. An IC tag is provided inside an upper plate provided so as to cover an upper end surface of a filter medium in a filter element. A lid body is provided on the case into which the filter element is inserted, and an antenna is provided on the lid body.

7 Claims, 10 Drawing Sheets

(58) Field of Classification Search
CPC .......... G06K 19/0723–0728; G06K 19/07758; C02F 2209/008; C02F 2209/445
See application file for complete search history.

(56) References Cited

U.S. PATENT DOCUMENTS

| | | | |
|---|---|---|---|
| 11,135,531 B2 * | 10/2021 | Bautz | B01D 35/027 |
| 2007/0052522 A1 | 3/2007 | Kokuryo et al. | |
| 2008/0131629 A1 | 6/2008 | Chisholm et al. | |
| 2012/0303204 A1 | 11/2012 | Narisako et al. | |
| 2018/0117508 A1 | 5/2018 | Paluszewski et al. | |

FOREIGN PATENT DOCUMENTS

| | | | |
|---|---|---|---|
| JP | 2007-69722 A | 3/2007 | |
| JP | 2008-290004 A | 12/2008 | |
| JP | 2012-241657 A | 12/2012 | |
| JP | 2018-69228 A | 5/2018 | |
| WO | 2005/113112 A1 | 12/2005 | |
| WO | 2014/203377 A1 | 12/2014 | |
| WO | 2015/002307 A1 | 1/2015 | |
| WO | WO-2020049457 A1 * | 3/2020 | B01D 46/009 |

OTHER PUBLICATIONS

International Search Report issued in PCT/JP2018/046284 dated Feb. 26, 2019 with English Translation (4 pages).
Extended European Search Report issued in European Patent Application No. 18894233.8, dated Jan. 20, 2021 (8 pages).

* cited by examiner

FILTER DEVICE

CROSS-REFERENCE TO RELATED APPLICATIONS

This application is a continuation application of International Patent Application No. PCT/JP2018/046284 filed on Dec. 17, 2018, which claims priority to Japanese Patent Application No. 2017-250185 filed on Dec. 26, 2017, the entire contents of which are incorporated by reference.

TECHNICAL FIELD

The present invention relates to a filter device.

BACKGROUND ART

For example, an apparatus that includes a hydraulic circuit, such as a construction machine, includes a filtration device in this hydraulic circuit. Patent Document 1 discloses a return filter unit that includes a filter element including a filter medium that filters hydraulic oil and a tank housing the filter element.

CITATION LIST

Patent Document

Patent Document 1: JP 2008-290004 A

In recent years, to reduce mounting of an imitation and management of an operating time and the like, attaching an IC tag to a filter element has been demanded. The IC tag immersed in liquid breaks easily. Therefore, when the IC tag is attached to a filter device, the IC tag preferably does not contact the liquid to avoid a failure of the IC tag. However, in the invention described in Patent Document 1, since all of the return filter unit contacts the liquid, a problem that there is no space appropriate for attaching the IC tag in the return filter unit occurs.

SUMMARY OF INVENTION

One or more embodiment of the present invention has been made in view of the circumstances, and to provide a filter device in which an IC tag is attached to a filter element and that allows avoiding the IC tag to contact liquid.

A filter device according to one or more embodiments of the present invention, for example, includes a case, a lid body, a filter element, an IC tag, and an antenna. The case has a bottomed tubular shape with an open upper end. The lid body is provided on the case so as to cover the upper end of the case. The filter element has a substantially cylindrical shape provided in an internal space formed by the case and the lid body. The filter element includes a filter medium and an upper plate. The filter medium has a substantially cylindrical shape. The upper plate is provided so as to cover an upper end surface of the filter medium. The IC tag is provided inside the upper plate. The antenna is provided on the lid body.

According to one or more embodiments of the present invention, the IC tag is provided inside the upper plate provided so as to cover the upper end surface of the filter medium in the filter element. The lid body is provided on the case into which the filter element is inserted, and the antenna is provided on the lid body. Accordingly, the IC tag is attached to the filter element and a contact of the IC tag with liquid is avoidable.

Here, the upper plate may include a plate-like (plate-shaped) portion and a convex portion. The filter medium may abut on a lower side of the plate-like portion. The convex portion may be provided in the plate-like portion. The IC tag may be provided inside the convex portion. The lid body may have a projection to position the convex portion in a circumferential direction. The antenna may be provided in a vicinity of the projection. With the filter element inserted into an inside of the case, the convex portion may be adjacent to the projection. As a result, the IC tag is adjacent to the antenna, and sensing becomes easy.

Here, the convex portion may protrude upward from the plate-like portion in side view and protrude outward of the plate-like portion in plan view. With the filter element inserted into the inside of the case, an end surface of the IC tag may be opposed to an end surface of the antenna. As a result, the IC tag and the antenna are disposed at the nearest positions, and the sensing is reliably performed.

A filter device according to one or more embodiments of the present invention, for example, includes a case, a lid body, a filter element, an IC tag, and an antenna. The case has a substantially bottomed tubular shape with an open upper end. The lid body is provided on the case so as to cover the upper end of the case. The filter element has a substantially cylindrical shape provided in an internal space formed by the case and the lid body. The filter element includes a filter medium and an upper plate. The filter medium has a substantially cylindrical shape. The upper plate is provided so as to cover an upper end surface of the filter medium. The filter medium and the upper plate are bonded with an adhesive. The IC tag having a substantially plate shape is provided inside the adhesive. The antenna is provided on the lid body. Accordingly, the IC tag is attached to the filter element and the contact of the IC tag with liquid is avoidable. Furthermore, man-hours and cost for coating the IC tag with resin can be reduced.

Here, the IC tag may have a substantially hollow circular plate shape. The IC tag may have an inner diameter greater than an inner diameter of the filter medium. This eliminates a need for positioning the IC tag and the antenna and facilitates assembly of the filter device.

Here, the IC tag may have a substantially circular plate shape. The filter element may be provided so that the IC tag and the antenna are linearly arranged. This facilitates sealing the IC tag in the adhesive.

Here, the lid body may have a tubular portion having a substantially cylindrical shape. The tubular portion may have an inner diameter greater than an outer diameter of the upper plate. The tubular portion may have a through-hole that penetrates a side surface of the tubular portion. The antenna may be provided inside the through-hole. This allows mounting the antenna to an inside of the lid body. Moreover, the mounting of the antenna to the lid body is easy.

With one or more embodiment of the present invention, the IC tag is attached to the filter element and the contact of the IC tag with liquid is avoidable.

DESCRIPTION OF EMBODIMENTS

Hereinafter, with reference to the drawings, detailed description will be made on embodiments of the present invention. In the present embodiment, while hydraulic oil is described as an example of liquid to be filtered, the liquid to be filtered is not limited to the hydraulic oil. Also, while the following embodiments are described with an example of a return filter, a filter device of the present invention is not limited to the return filter.

First Embodiment

Figure 1:
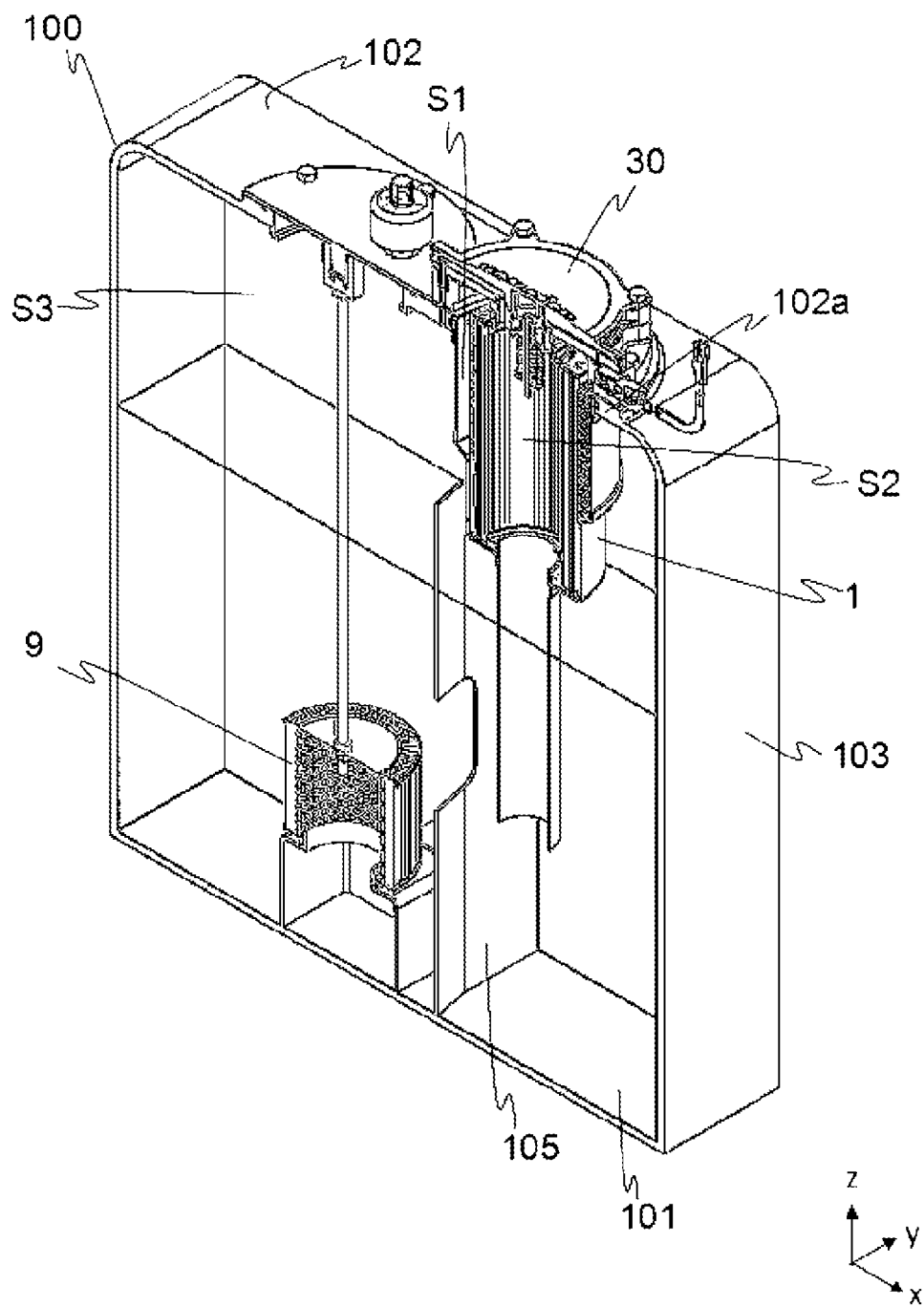
FIG. 1 is a cross-sectional perspective view illustrating an overview of a tank 100 in which a return filter 1 according to one embodiment of the present invention is provided.

FIG. 1 is a cross-sectional perspective view illustrating an overview of a tank 100 in which a return filter 1 according to one embodiment of the present invention is provided. In FIG. 1, hatching for indicating a cross section is omitted.

The tank 100 is a tank for storing hydraulic oil. The tank 100 is installed in a work machine (not illustrated) (e.g., a hydraulic device), and is provided in a hydraulic circuit of hydraulic oil supplied to the hydraulic device. However, the tank 100 is not limited to one provided in the hydraulic circuit.

The tank 100 is, for example, formed in a box-like shape and hollow inside. The tank 100 mainly has a bottom surface 101, a top surface 102 opposed to the bottom surface 101, and side surfaces 103 substantially orthogonal to the bottom surface 101 and the top surface 102. An opening 102a (see FIG. 2) is formed in the top surface 102. The return filter 1 is inserted into an inside of the tank 100 from the opening 102a. The opening 102a is covered with a lid body 30 (described in detail later) of the return filter 1.

An inflow portion (not illustrated) that causes the hydraulic oil to flow into the inside of the return filter 1 is inserted through the side surface 103. The inflow portion introduces the hydraulic oil from an outside of the tank 100 to the return filter 1. The hydraulic oil introduced into the return filter 1 is filtered by the return filter 1 and stored in the tank 100.

An outflow port (not illustrated) that causes the hydraulic oil in the tank 100 to flow out to, for example, a hydraulic pump (not illustrated) is formed in the vicinity of the bottom surface 101. A suction strainer 9 is provided inside the tank 100. The hydraulic oil that has passed through the suction strainer 9 flows out from the outflow port to the outside of the tank 100.

A partition plate 105 is provided inside the tank 100 such that the hydraulic oil that has flown out from the return filter 1 does not directly contact the suction strainer 9. Note that the partition plate 105 is not necessarily required.

Figure 2:
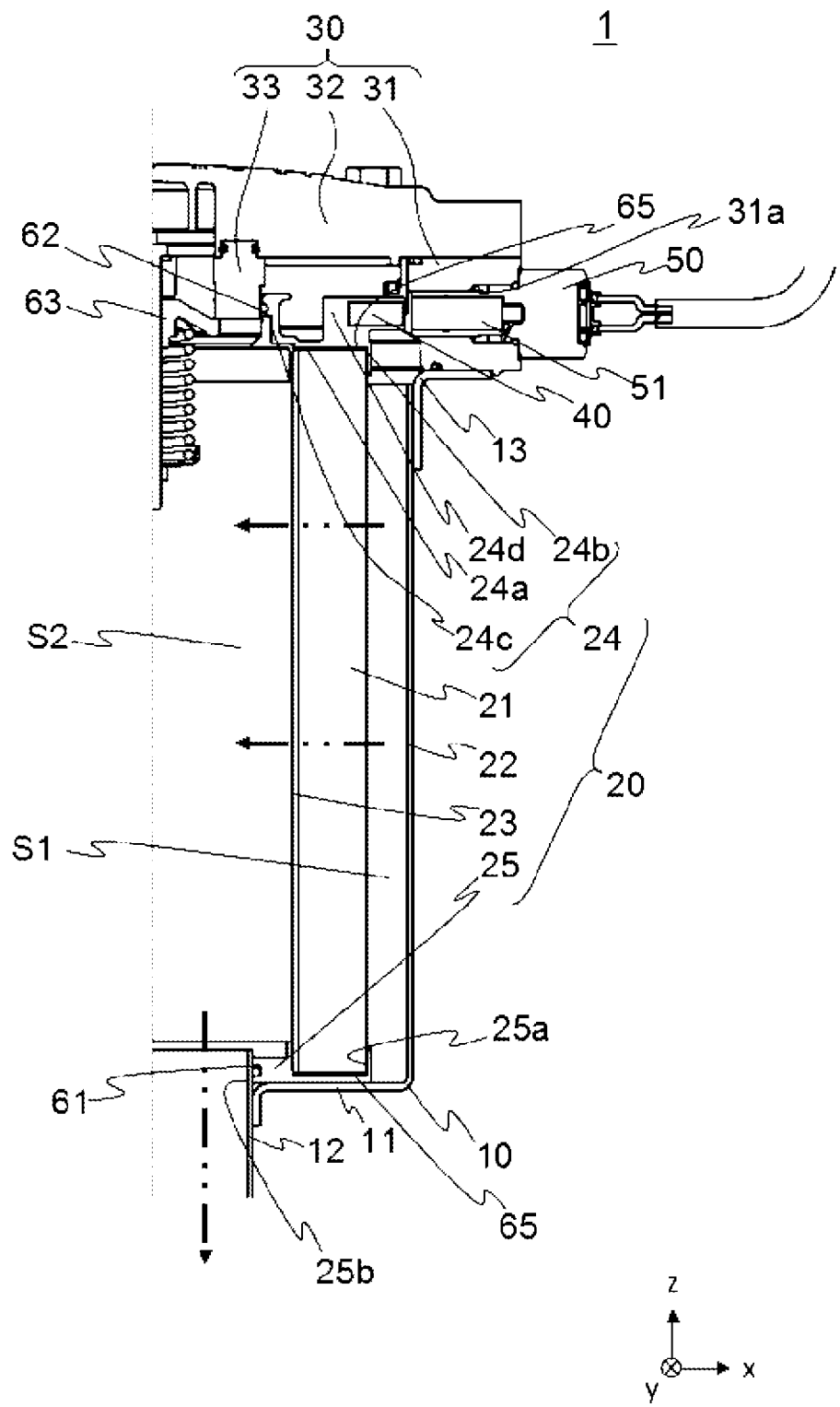
FIG. 2 is a cross-sectional view illustrating an overview of the return filter 1.
Figure 3:
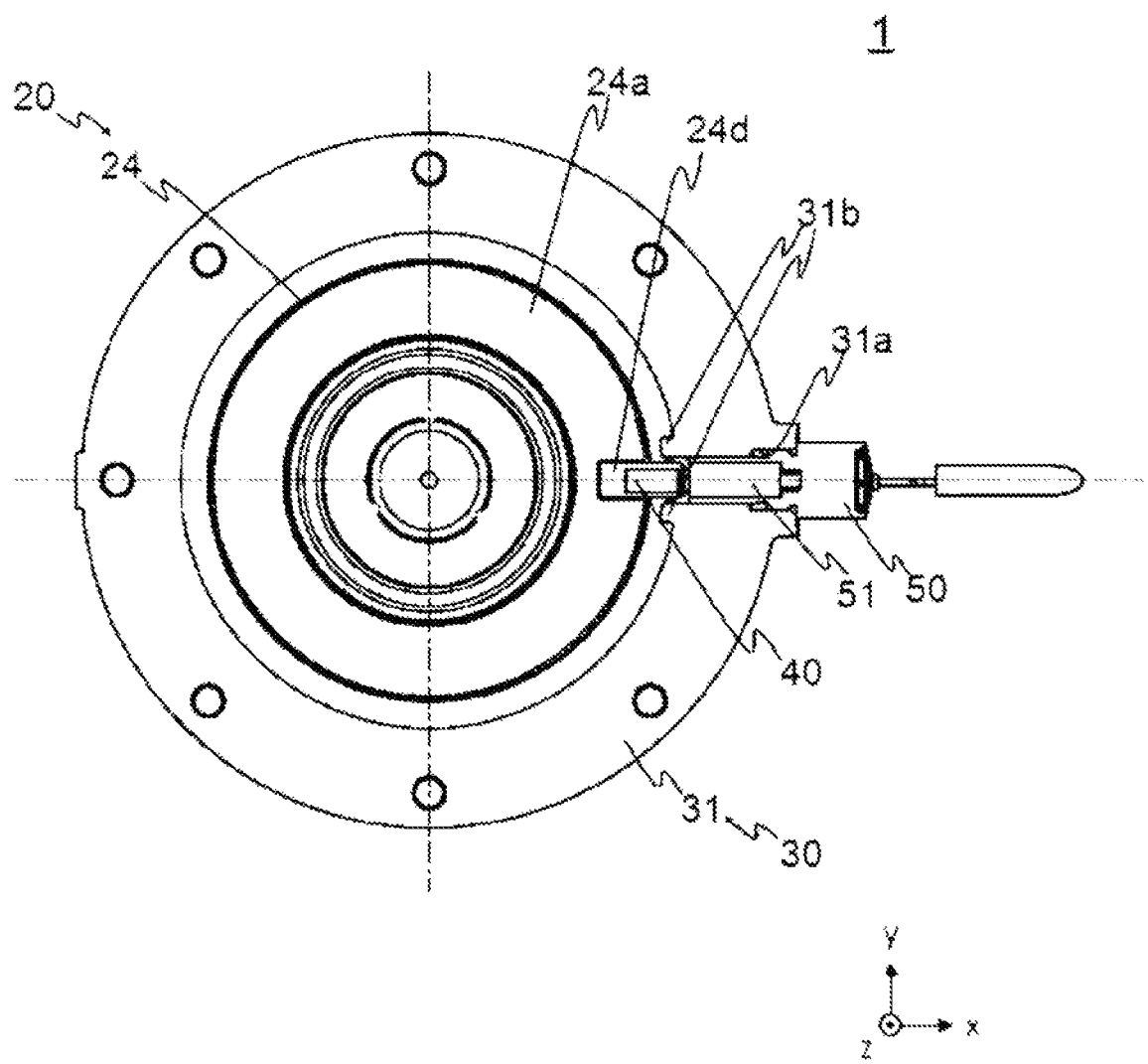
FIG. 3 is a plan view illustrating an overview of the return filter 1 and is a drawing illustrating a state in which a part of a lid body 30 is removed.

Next, the return filter 1 will be described. FIG. 2 is a cross-sectional view illustrating an overview of the return filter 1. In FIG. 2, hatching for indicating a cross section is omitted, and illustration of a part on the −x side with respect to the center line is omitted. FIG. 3 is a plan view illustrating an overview of the return filter 1 and is a drawing illustrating a state in which a part of the lid body 30 is removed.

The return filter 1 mainly includes a case 10, a filter element 20, the lid body 30, an IC tag 40, and an antenna assembly 50. The IC tag 40 is a small electronic component that contactlessly reads and writes data in a built-in memory using radio waves received from an antenna 51 (described below). The antenna 51 is connected to an external device and receives radio waves from the IC tag 40.

The case 10 is made of a metal having high corrosion resistance (for example, stainless steel). The case 10 is provided inside the tank 100 so as to protrude from the top surface 102 of the tank 100 to a lower side (−z-side) (see FIG. 1).

The case 10 has a bottomed substantially tubular shape and has an open upper end surface. The case 10 is hollow inside and internally includes, for example, the filter element 20.

The case 10 has a bottom surface 11. An outflow portion 12 is provided so as to penetrate the bottom surface 11. The outflow portion 12 communicates between a space inside the filter element 20 (space S2) and a space outside the case 10 (space S3, see FIG. 1).

A mounting member 13 is provided in the vicinity of an upper end of the case 10. The case 10 is provided in the tank 100 via the mounting member 13. Furthermore, the mounting member 13 integrates the case 10 and a tubular portion 31 (described in detail later).

The inflow portion (not illustrated) is provided on a side surface of the case 10. The inflow portion communicates between a space inside the case 10 and outside the filter element 20 (space SD and the space outside the case 10 and inside the tank 100 (space S3, see FIG. 1). An inflow of the hydraulic oil from the inflow portion stores the hydraulic oil in the case 10.

The filter element 20 is a member having a bottomed substantially tubular shape and provided in an internal space formed by the case 10 and the lid body 30. The filter element 20 mainly includes a filter medium 21, an outer tube 22, an inner tube 23, a plate 24, a plate 25, and the IC tag 40. The outer tube 22, the inner tube 23, and the plates 24, 25 are integrated with the filter medium 21.

The filter medium 21 is a member having a substantially cylindrical shape and having openings at both ends. The filter medium 21 is formed by pleating a filter paper using, for example, synthetic resin or a paper, and connecting both ends of the pleated filter paper to form a cylindrical shape. The inner tube 23 where holes through which the hydraulic oil passes are formed in a substantially entire area is provided inside the filter medium 21.

The outer tube 22 is provided on an outer side of the filter medium 21, and the inner tube 23 is provided on an inner side of the filter medium 21. Holes (not illustrated) through which the hydraulic oil passes are provided on entire surfaces of the outer tube 22 and the inner tube 23.

The plate 24 made of resin is provided on an end on the upper side of the filter medium 21. The plate 24 covers upper end surfaces of the filter medium 21, the outer tube 22, and the inner tube 23. An adhesive 65 is applied between the plate 24 and the filter medium 21, and between the plate 24 and the filter medium 21 is bonded with the adhesive 65. Although the adhesive 65 is liquid when applied, the adhesive 65 hardens over time to bond the plate 24 and the filter medium 21 together. Here, various types of organic adhesives using resin, rubber, and elastomer as the main material can be used as the adhesive 65. Furthermore, the adhesive 65 may contain powder, such as silicon dioxide.

The plate 24 mainly includes a plate-like portion 24a having a substantially circular plate shape provided along an upper end surface of the filter medium 21 such that the filter medium 21 abuts on a lower side of the plate-like portion 24a, a tubular portion 24b provided on outer peripheral edge of the plate-like portion 24a, a tubular portion 24c provided on an inner peripheral edge of the plate-like portion 24a, and a convex portion 24d provided in the plate-like portion 24a. The tubular portion 24b protrudes downward (in the −z direction) from the plate-like portion 24a. The tubular portion 24c protrudes upward (in the +z direction) from the plate-like portion 24a.

The convex portion 24d protrudes upward from the plate-like portion 24a in side view (here, as illustrated in FIG. 2, when viewed from the y direction). Additionally, the convex portion 24d protrudes outward of the plate-like portion 24a in plan view (here, as illustrated in FIG. 3, when viewed from the z-direction).

The IC tag 40 is coated with resin. The IC tag 40 is provided inside the plate 24 so as to not contact the hydraulic oil. In the present embodiment, the IC tag 40 is provided inside the convex portion 24d.

The plate 25 is provided on an end on the lower side of the filter medium 21. The plate 25 is a member having a substantially hollow circular plate shape that covers lower end surfaces of the filter medium 21, the outer tube 22, and the inner tube 23. A recessed portion 25a into which the filter medium 21 is inserted is formed in a surface of the upper side of the plate 25. The adhesive 65 is applied between the recessed portion 25a and the filter medium 21, and the recessed portion 25a and the filter medium 21 are bonded with the adhesive 65.

The outflow portion 12 is inserted into a hole 25b formed in the substantially center of the plate 25. The hole 25b and the outflow portion 12 are sealed by a sealing member (for example, an O-ring) 61.

The lid body 30 is provided on an outer side of the tank 100. The lid body 30 is provided on the case 10 (here, the mounting member 13) and the plate 24 (here, the tubular portion 24c) so as to cover the opening of the upper end surface of the case 10.

The lid body 30 is made of a metal having high corrosion resistance (for example, stainless steel). The lid body 30 mainly includes the tubular portion 31, a cover 32, and a mounting portion 33. The tubular portion 31 has a substantially cylindrical shape and is fixed to the case 10 (here, the mounting member 13). The cover 32 is a substantially plate-shaped member and provided on the upper side (+z-side) of the tubular portion 31 so as to cover a hollow portion of the tubular portion 31. The cover 32 is detachably provided to the tubular portion 31.

The tubular portion 31 has an inner diameter greater than an outer diameter of the plate 24. The tubular portion 31 has a side surface on which a hole 31a penetrating the side surface is provided. The antenna assembly 50 is inserted into the hole 31a to fix (for example, screw) the antenna assembly 50, and thus the antenna assembly 50 is provided in the tubular portion 31. The antenna assembly 50 includes the antenna 51. Accordingly, the antenna 51 can be easily mounted to the inside of the lid body 30.

Two projections 31b (see FIG. 3) are formed in the side surface of the tubular portion 31. The projections 31b are formed so as to protrude inward in an inner circumferential surface of the tubular portion 31. The projections 31b are formed in the vicinity of the hole 31a, here, on both sides of the hole 31a. That is, the antenna 51 is provided in the vicinity of the projections 31b.

The projections 31b position the convex portion 24d in the circumferential direction. The convex portion 24d is disposed between the two projections 31b. In other words, in a state where the filter element 20 is inserted into the inside of the case 10, the convex portion 24d is adjacent to the projections 31b. Note that the convex portion 24d may abut on the projection 31b.

The mounting portion 33 is provided on the cover 32. The mounting portion 33 is a substantially tubular member, and protrudes to the lower side (−z-side) of the cover 32. A valve 63 is provided on a lower side of the mounting portion 33. The valve 63 is usually closed. When the filter medium 21 becomes clogged and the pressure inside the case 10 increases, the valve 63 opens to flow the hydraulic oil from the space S1 to the space S2 to reduce a breakage of the return filter 1. The valve 63 is already well known, and thus the description is omitted.

The mounting portion 33 is inserted into the tubular portion 24c, and the valve 63 is inserted into the space S2. The mounting portion 33 and the tubular portion 24c are sealed by a sealing member (for example, an O-ring) 62.

Figure 4:
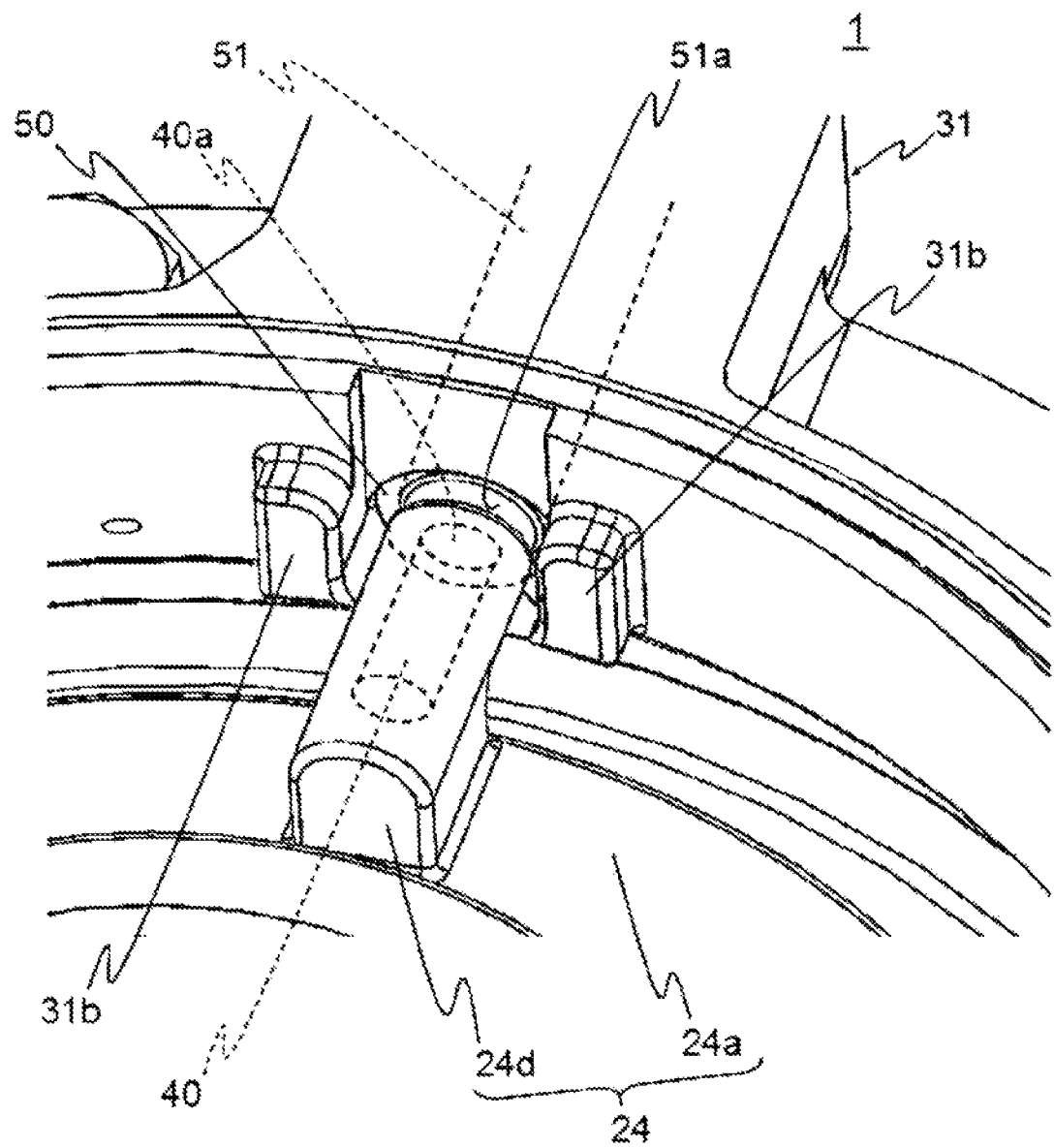
FIG. 4 is a perspective view of a plate 24 and a tubular portion 31 viewed obliquely from above and is a partially enlarged view.
Figure 5:
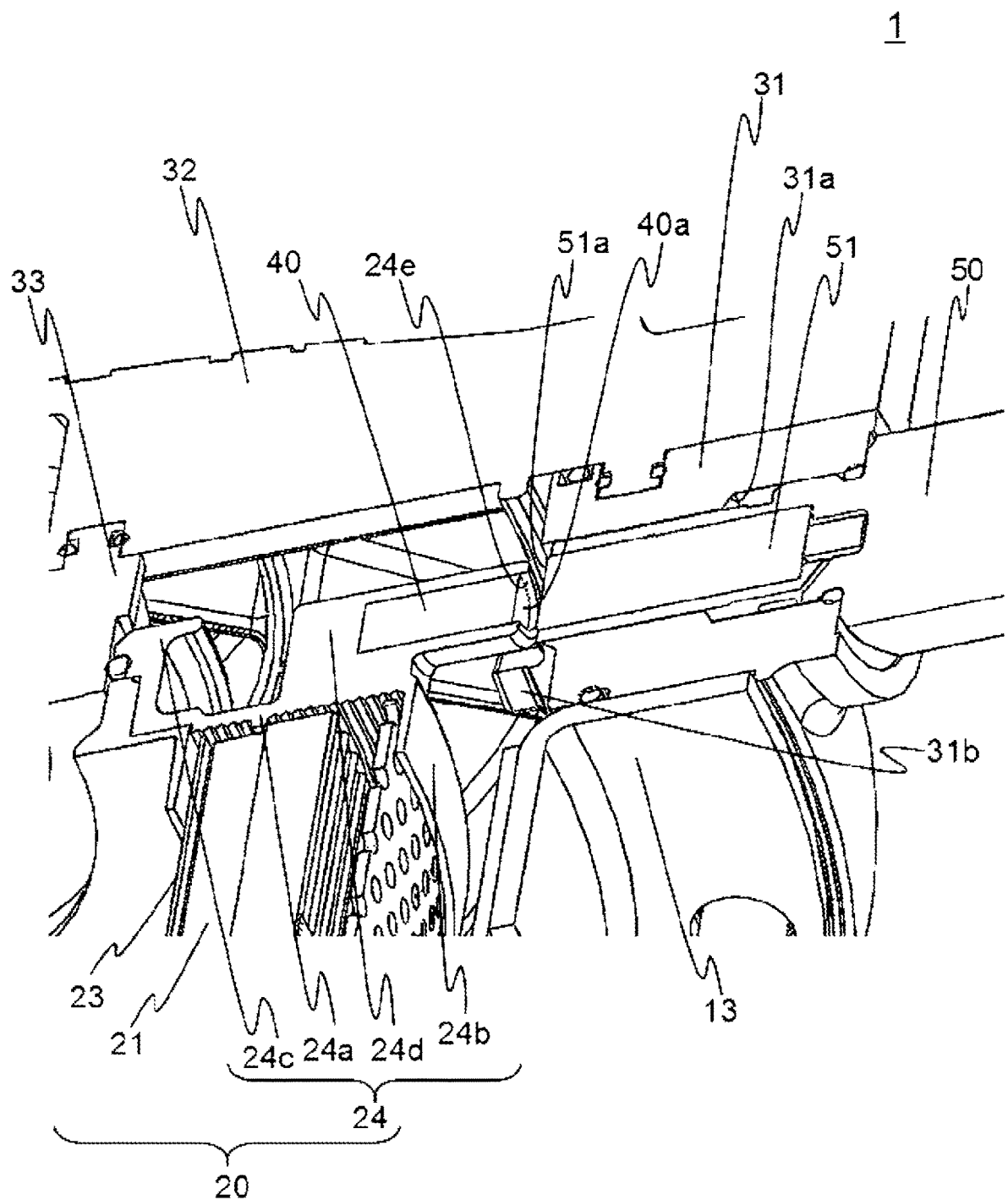
FIG. 5 is a cross-sectional perspective view of the return filter 1 when viewed diagonally from below and is a partially enlarged view.

Next, the attachment and disposition of the IC tag 40 and the antenna assembly 50 will be described. FIG. 4 is a perspective view of the plate 24 and the tubular portion 31 viewed obliquely from above and is a partially enlarged view. FIG. 5 is a cross-sectional perspective view of the return filter 1 when viewed diagonally from below and is a partially enlarged view. In FIG. 5, hatching for indicating a cross section is omitted.

A hole 24e that opens to an end surface outward in a radial direction of the convex portion 24d is provided in the convex portion 24d along a longitudinal direction of the convex portion 24d. The IC tag 40 has a substantially cylindrical shape and is inserted into the inside of the hole 24e to be fixed. Thus, only an end surface 40a visible through the opening of the hole 24e of the IC tag 40 contacts the hydraulic oil. In this manner, avoiding the contact of the resin-coated IC tag 40 with the liquid as much as possible allows reducing a failure of the IC tag 40.

Note that, after the IC tag 40 is inserted into the hole 24e, covering the opening of the hole 24e with resin or the like allows avoiding the IC tag 40 to contact the liquid completely.

Into the hole 31a, which penetrates the side surface of the tubular portion 31, the antenna assembly 50 is inserted. An end surface 51a of the antenna 51 is exposed from the opening on the inner circumferential surface side of the hole 31a.

The two projections 31b formed on the side surface of the tubular portion 31 serve as positioning of the filter element 20. The filter element 20 is inserted into the inside of the case 10 such that the convex portion 24d is disposed between the two projections 31b. As a result, the IC tag 40 and the antenna 51 are linearly arranged. In addition, because the convex portion 24d protrudes upward from the plate-like portion 24a in side view and protrudes outward of the plate-like portion 24a in plan view, in the state where the filter element 20 is inserted into the inside of the case 10, the IC tag 40 is adjacent to the antenna 51, and the end surface 40a of the IC tag 40 is opposed to the end surface 51a of the antenna 51. Therefore, the IC tag 40 and the antenna 51 are disposed as close as possible, and thus sensing can be reliably performed.

Next, the functionality of the return filter 1 thus configured will be described. The dash-dotted line arrows in FIG. 2 indicate a flow of the hydraulic oil. For example, when the work machine starts driving, the hydraulic oil starts flowing the inside of the hydraulic circuit. In association with this, the hydraulic oil flows into the space S1 and the inside of the case 10 is filled with the hydraulic oil.

The hydraulic oil flowing into the space S1 flows from the outside to the inside of the filter medium 21, and the filter medium 21 removes, for example, dust in the hydraulic oil. The hydraulic oil after filtration flows out to the space S2. After that, the hydraulic oil after filtration flows out from the outflow portion 12 to the space S3 (see FIG. 1).

Since the repeated filtration clogs the filter medium 21, the filter element 20 is replaced. Because the clogging of the filter medium 21 is substantially proportional to the operating time of the filter element 20, the operating time of the filter element 20 is measured by the IC tag 40, and the antenna 51 reads the IC tag 40 and transmits the operating time to the external device. When the operating time of the filter element 20 has elapsed for a certain period of time, the external device provides a display prompting replacement of the filter element 20. The filter element 20 after replacement is provided with the IC tag 40 different from that of the filter element 20 prior to the replacement, and the operating time of the filter element 20 after the replacement is measured by reading the IC tag 40. In addition, when an imitation or the like in which the IC tag 40 is not provided is used as the filter element after replacement, needless to say, the IC tag 40 cannot be read. The external device can perform error display or disable the operation of the filter device. For example, by reading the IC tag 40 provided on the filter element 20 after the replacement, the external device can determine that a filter element other than the predetermined filter element is provided.

With the present embodiment, because the convex portion 24d is provided in the plate 24 and the IC tag 40 is provided inside the convex portion 24d, the contact between the IC tag 40 and the hydraulic oil is avoidable while the IC tag 40 is attached to the filter element 20. This allows reducing a failure of the IC tag 40.

In addition, with the present embodiment, because the plate 24 is made of resin and the antenna 51 is exposed from the opening on the inner circumferential surface side of the hole 31a, even when the lid body 30 is made of metal, recording information of the IC tag 40 can be accurately read. Furthermore, because the IC tag 40 is adjacent to the antenna 51, and the IC tag 40 and the antenna 51 are linearly arranged, the IC tag 40 and the antenna 51 can be disposed as close as possible, and the recording information of the IC tag 40 can be accurately read.

Note that, although the plate 24 is made of the resin in the present embodiment, the material of the plate 24 is not limited to the resin. The material of the plate 24 only needs to have high corrosion resistance, and may be, for example, a metal such as stainless steel. Since the end surface 40a is exposed from the plate 24, a failure does not occur in sensing.

Second Embodiment

The second embodiment of the present invention is a configuration in which a plate-shaped IC tag is provided inside an adhesive that bonds the filter medium and the plate together. Below, description is given of a return filter 2 according to the second embodiment. Note that the same components as those in the first embodiment are denoted by the same reference numerals, and descriptions thereof will be omitted.

Figure 6:
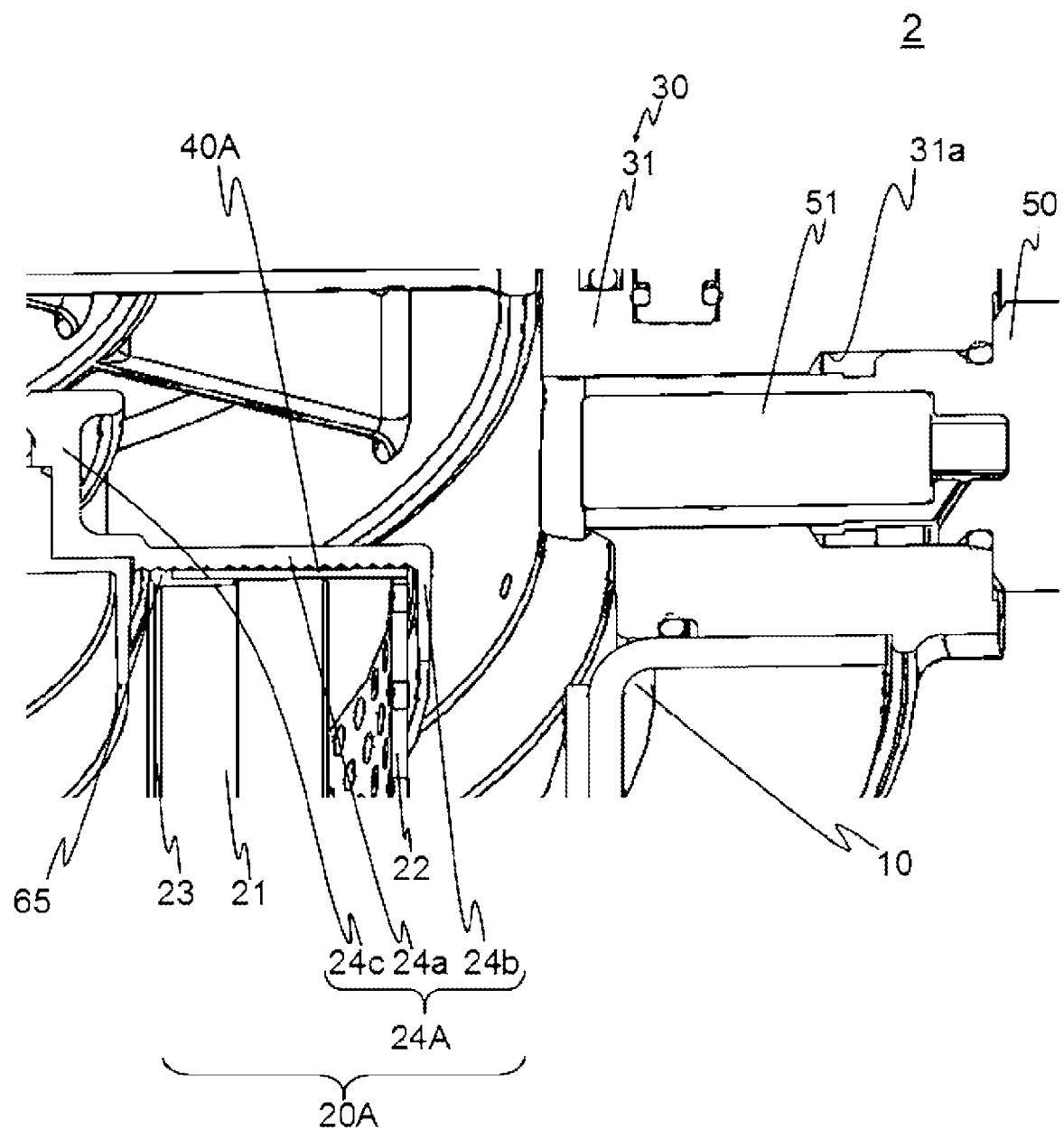
FIG. 6 is a cross-sectional perspective view of a return filter 2 and is a partially enlarged view.

FIG. 6 is a cross-sectional perspective view of the return filter 2 when viewed diagonally from below and is a partially enlarged view. In FIG. 6, hatching for indicating a cross section is omitted.

The return filter 2 is provided inside the tank 100 and mainly includes the case 10, a filter element 20A, the lid body 30, an IC tag 40A, and the antenna assembly 50.

The filter element 20A mainly includes the filter medium 21, the outer tube 22, the inner tube 23, a plate 24A, the plate 25 (not illustrated in FIG. 6), and the IC tag 40A. A difference between the plate 24 and the plate 24A is presence/absence of the convex portion 24d and the hole 24e, and the plate 24A does not have the convex portion 24d or the hole 24e.

The adhesive 65 is sealed between the filter medium 21 and the plate 24A, and between the filter medium 21 and the plate 24A is bonded with the adhesive 65. The IC tag 40A is sealed in the adhesive 65.

Figure 7:
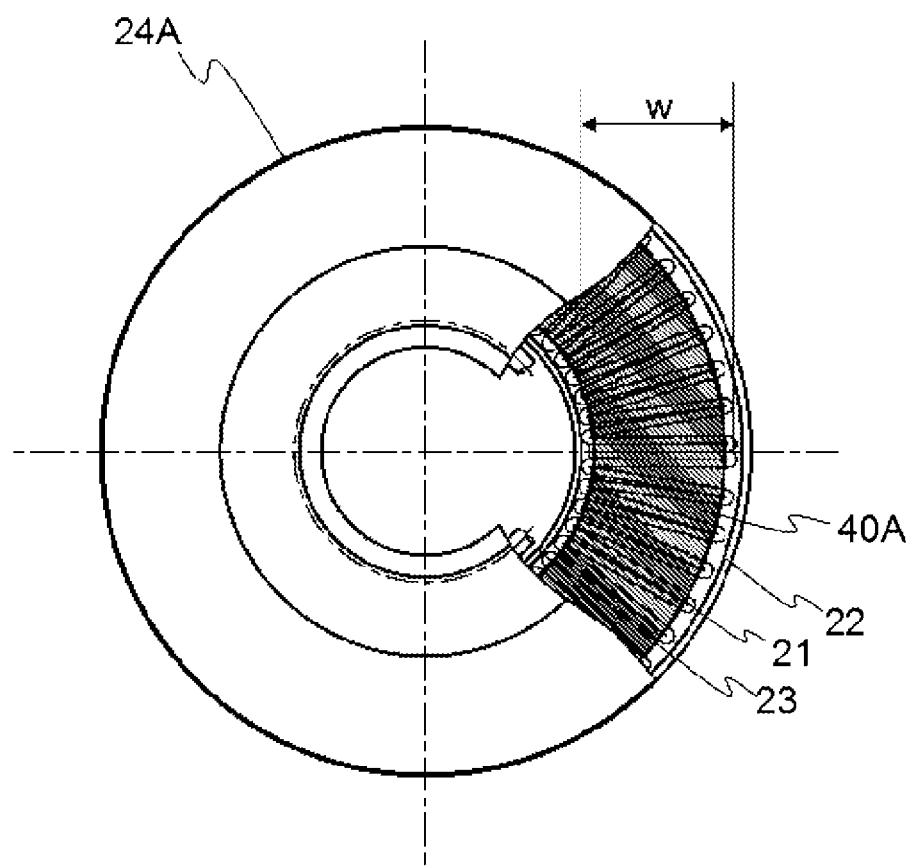
FIG. 7 is a plan view of a filter element 20A and is a drawing in which a plate 24A is partially cut off.

FIG. 7 is a plan view of the filter element 20A and is a drawing in which the plate 24A is partially cut off.

The IC tag 40A has a substantially hollow circular plate shape. The IC tag 40A has an inner diameter greater than the inner diameter of the filter medium 21. Accordingly, the IC tag 40A can be provided inside the adhesive 65, which bonds the filter medium 21 and the plate 24 together.

With the present embodiment, because the IC tag 40A is provided inside the adhesive 65, which bonds the filter medium 21 and the plate 24A together, the contact between the IC tag 40A and the hydraulic oil is avoidable while the IC tag 40A is attached to the filter element 20A. This allows reducing a failure of the IC tag 40A.

In addition, with the present embodiment, because the IC tag 40A is embedded into the adhesive 65, which bonds the filter medium 21 and the plate 24A together, man-hours and cost for coating the IC tag 40A with resin can be reduced.

In addition, with the present embodiment, because the IC tag 40A has the substantially hollow circular plate shape, positioning of the IC tag 40A with the antenna 51 is unnecessary, and the assembly of the return filter 2 is easy.

Note that, although the plate 24A is made of the resin in the present embodiment, the plate 24A may be made of a metal. Even when the plate 24A is made of metal, the filter medium 21 side is not covered with the metal, and therefore the sensing is possible.

Third Embodiment

The third embodiment of the present invention, similar to the second embodiment, is a configuration in which a plate-shaped IC tag is provided inside an adhesive that bonds the filter medium and the plate together. A return filter 3 according to the third embodiment will be described below. Note that the same components as those in the first embodiment or the second embodiment are denoted by the same reference numerals, and descriptions thereof will be omitted.

A difference between the return filter 2 according to the second embodiment and the return filter 3 according to the present embodiment is only a shape of the IC tag. The difference between return filter 3 and return filter 2 will be mainly described.

Figure 8:
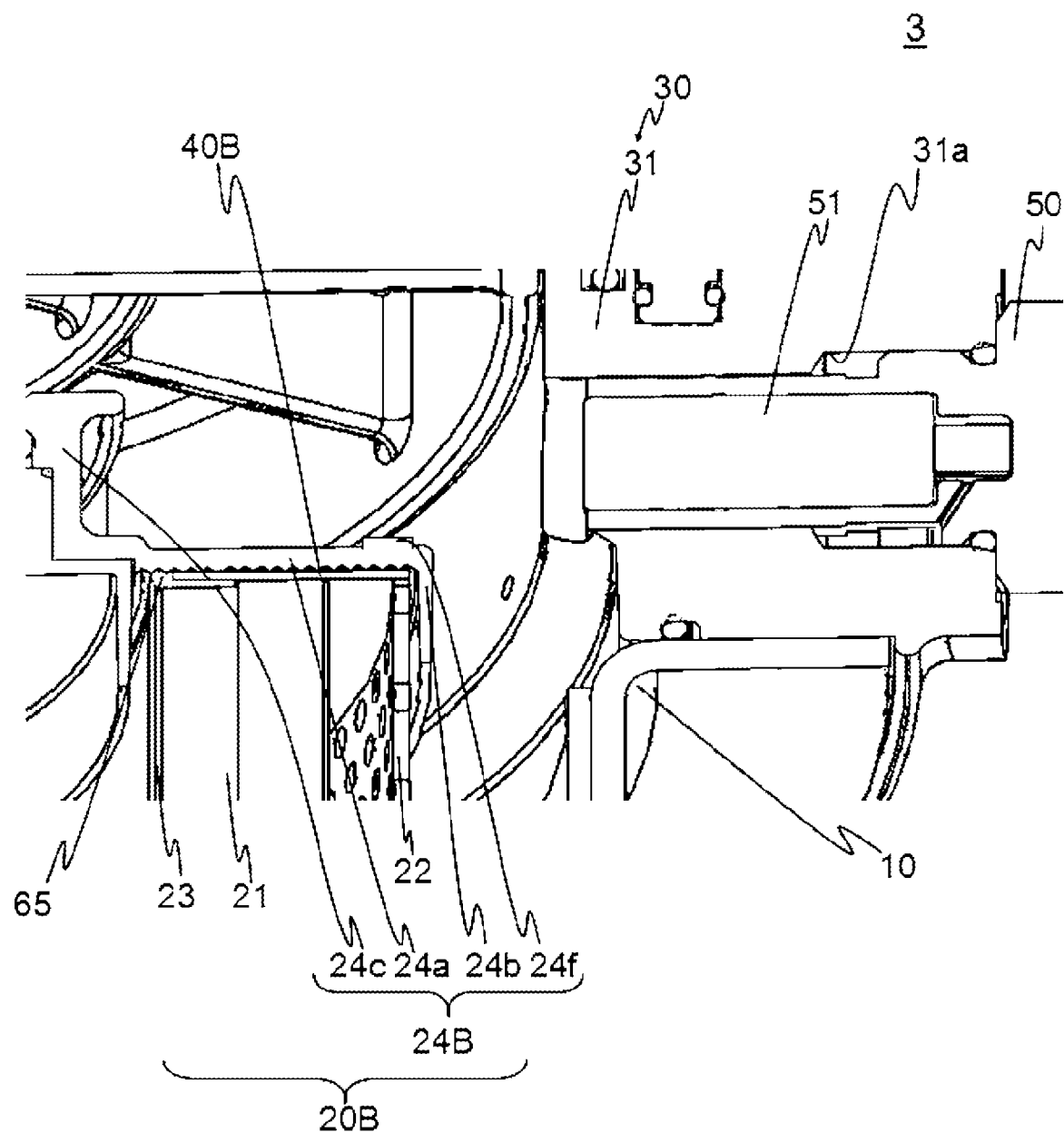
FIG. 8 is a cross-sectional perspective view of a return filter 3 and is a partially enlarged view.

FIG. 8 is a cross-sectional perspective view of the return filter 3 when viewed diagonally from below and is a partially enlarged view. In FIG. 8, hatching for indicating a cross section is omitted.

The return filter 3 is provided inside the tank 100 and mainly includes the case 10, a filter element 20B, the lid body 30, an IC tag 40B, and the antenna assembly 50.

The filter element 20B mainly includes the filter medium 21, the outer tube 22, the inner tube 23, a plate 24B, the plate 25 (not illustrated in FIG. 6), and the IC tag 40B. A difference between the plate 24 and the plate 24B is presence/absence of the convex portion 24d and the hole 24e, and the plate 24B does not have the convex portion 24d or the hole 24e. In addition, a rib 24f is formed on a surface on an upper side of the plate-like portion 24a in the plate 24B. The rib 24f is formed during molding of the plate 24B and serves as a marking (described later).

The adhesive 65 is sealed between the filter medium 21 and the plate 24B, and between the filter medium 21 and the plate 24B is bonded with the adhesive 65. The IC tag 40B is sealed in the adhesive 65.

Figure 9:
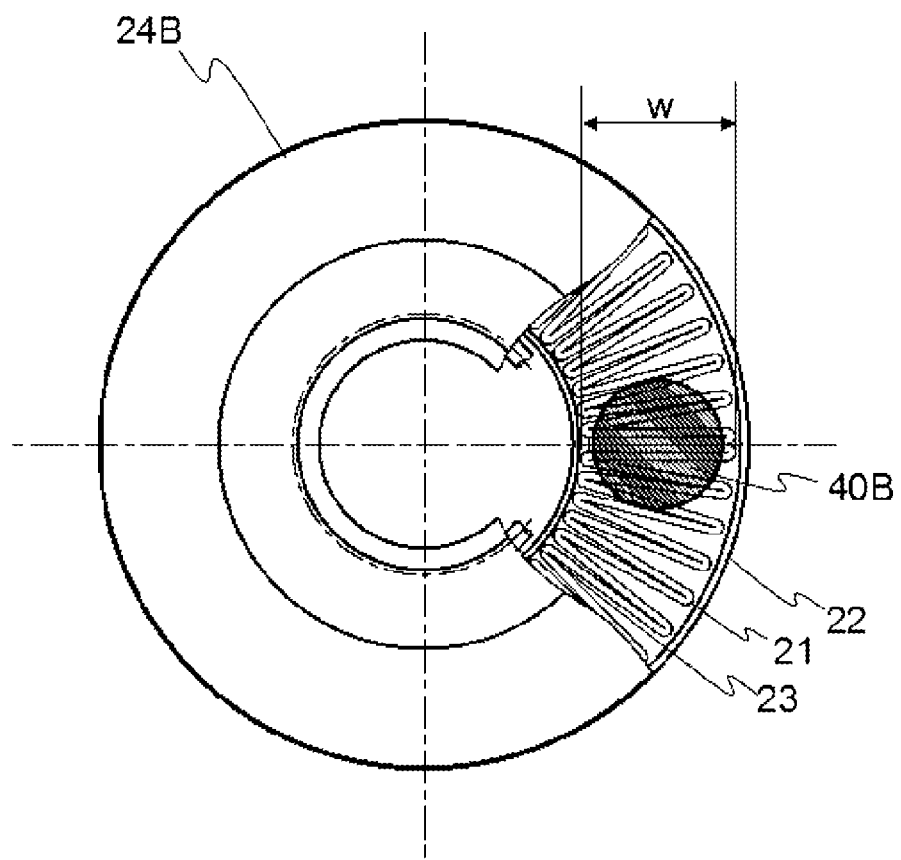
FIG. 9 is a plan view of a filter element 20B and is a drawing in which a plate 24B is partially cut off.

FIG. 9 is a plan view of the filter element 20B and is a drawing in which the plate 24B is partially cut off.

The IC tag 40B has a substantially circular plate shape. The IC tag 40B has a diameter smaller than a width w of the filter medium 21. Accordingly, the IC tag 40B can be provided inside the adhesive that bonds the filter medium 21 and the plate 24B together.

When the adhesive 65 is applied over the filter medium 21, the IC tag 40B is sealed in the adhesive 65, and after that, the plate 24B is placed on the adhesive 65. At this time, the rib 24f and the IC tag 40B are disposed so as to overlap in plan view. When the filter element 20B is inserted into the inside of the case 10, the rib 24f and the antenna assembly 50 are disposed to be linearly arranged in plan view. As a result, the filter element 20B is provided in the internal space formed by the case 10 and the lid body 30 so that the IC tag 40B and the antenna 51 are linearly arranged.

With the present embodiment, because the IC tag 40B is provided inside the adhesive, which bonds the filter medium 21 and the plate 24B together, the contact between the IC tag 40B and the hydraulic oil is avoidable while the IC tag 40B is attached to the filter element 20B. This allows reducing a failure of the IC tag 40B. In addition, because the IC tag 40B is embedded into the adhesive, which bonds the filter medium 21 and the plate 24B together, man-hours and cost for coating the IC tag 40B with resin can be reduced.

In addition, with the present embodiment, the IC tag 40B has the substantially circular plate shape and has the diameter smaller than the width w of the filter medium 21, and therefore sealing the IC tag 40B in the adhesive is easy.

Figure 10:
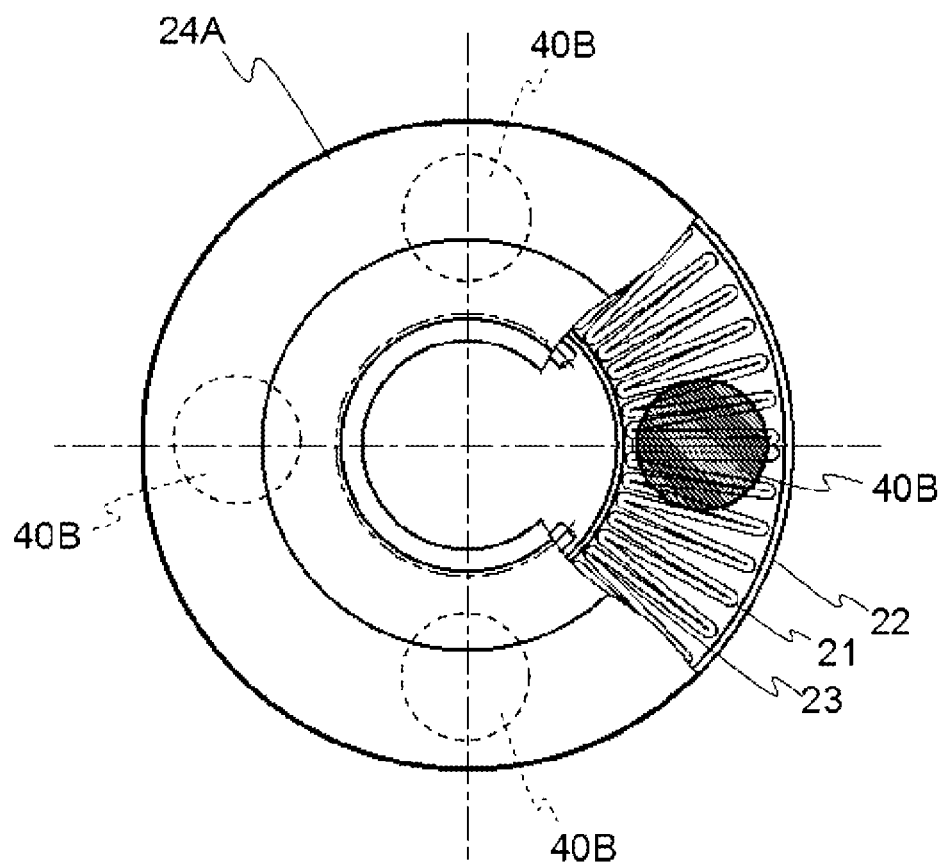
FIG. 10 is a schematic diagram of a filter element 20C according to a modified example.

Note that, although the plate 24B is made of the resin in the present embodiment, the plate 24B may be made of a metal, similarly to the plate 24A. While one small IC tag 40B having the substantially circular plate shape is provided in the present embodiment, a plurality of the IC tags 40B may be provided. For example, the plurality of (four, six, eight, or the like) IC tags 40B may be radially provided. FIG. 10 is a schematic diagram of a filter element 20C according to a modified example in which the four IC tags 40B are radially provided. Thus radially providing the plurality of IC tags 40B eliminates the need for matching the positions of the filter element 20 and the antenna 51. In addition, since the rib 24f is unnecessary in the filter element 20C, the plate 24A in which the rib 24f is not formed can be used.

The embodiments of the invention are described above in detail with reference to the drawings. Specific configurations are not limited to the embodiments and also include changes in the design or the like within a scope that does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

In addition, the term "substantially" is not to be understood as merely being strictly the same, and is a concept that includes errors and modifications to an extent that does not result in loss in identity. For example, the "substantially cylindrical shape" is a concept that includes a case where, for example, the shape can be placed in the same category as the cylindrical shape, and is not strictly limited to the cylindrical shape. Further, simple expressions such as orthogonal, parallel, and identical are not to be understood as merely being strictly, for example, orthogonal, parallel, and identical, and include being, for example, substantially parallel, substantially orthogonal, and substantially identical.

In addition, the term "vicinity" means to include a range of regions (which can be determined as desired) near a position serving as a reference. For example, the term "a vicinity of an end" refers to a range of regions vicinity the end, and is a concept indicating that the end may or needs not be included.

REFERENCE SIGNS LIST 1, 2, 3 Return filter
9 Suction strainer
10 Case
11 Bottom surface
12 Outflow portion
13 Mounting member
20, 20A, 20B, 20C Filter element
21 Filter medium
22 Outer tube
23 Inner tube
24, 24A, 24B Plate
24a Plate-like portion
24b Tubular portion
24c Tubular portion
24d Convex portion
24e Hole
24f Rib
25 Plate
25a Recessed portion
25b Hole
30 Lid body
31 Tubular portion
31a Hole
31b Projection
32 Cover
33 Mounting portion
40, 40A, 40B IC tag
40a End surface
50 Antenna assembly
51 Antenna
51a End surface
61, 62 Sealing member
63 Valve
65 Adhesive 100 Tank
101 Bottom surface
102 Top surface
102a Opening
103 Side surface
105 Partition plate

The invention claimed is:

1. A filter device, comprising:
a case having a bottomed tubular shape with an open upper end;
a lid body provided on the case so as to cover the upper end of the case;
a filter element having a substantially cylindrical shape provided in an internal space formed by the case and the lid body, the filter element including a filter medium and an upper plate, the filter medium having a substantially cylindrical shape, the upper plate being provided so as to cover an upper end surface of the filter medium;
an IC tag provided inside the upper plate; and
an antenna provided inside the lid body, between a top surface of the lid body and the filter case,
wherein:
the upper plate includes a plate-shaped portion and a convex portion, the filter medium abuts on a lower side of the plate-shaped portion, and the convex portion is provided in the plate-shaped portion;
the IC tag is provided inside the convex portion;
the lid body has two projections to position the convex portion in a circumferential direction;
the antenna is provided in a vicinity of the two projections,
with the filter element inserted into the inside of the case, the convex portion being disposed between the two projections, the IC tag and the antenna are linearly arranged along a longitudinal direction of the convex portion, and an end surface of the IC tag is opposed to a tip of the antenna as being inserted in a radial direction of the filter element; and
the two projections protrude in a direction along an insertion direction of the tip of the antenna.

2. The filter device according to claim 1, wherein the convex portion protrudes upward from the plate-shaped portion in side view and protrudes outward of the plate-shaped portion in plan view.

3. The filter device according to claim 2, wherein the lid body has a tubular portion having a substantially cylindrical shape, the tubular portion has an inner diameter greater than an outer diameter of the upper plate, and
the tubular portion has the through-hole, in which the antenna is inserted.

4. The filter device according to claim 1, wherein the lid body has a tubular portion having a substantially cylindrical shape,
the tubular portion has an inner diameter greater than an outer diameter of the upper plate, and
the tubular portion has the through-hole, in which the antenna is inserted.

5. A filter device, comprising:
a case having a bottomed tubular shape with an open upper end;
a lid body provided on the case so as to cover the upper end of the case;
a filter element having a substantially cylindrical shape provided in an internal space formed by the case and the lid body, the filter element including a filter medium and an upper plate, the filter medium having a substantially cylindrical shape, the upper plate being provided so as to cover an upper end surface of the filter medium, the filter medium and the upper plate being bonded with an adhesive;
an IC tag having a substantially plate shape provided inside the adhesive; and
an antenna provided inside the lid body,
wherein:
the lid body has a tubular portion having a cylindrical shape between a top surface of the lid body and the filter case;
the tubular portion has an inner diameter greater than an outer diameter of the upper plate; and
the antenna is inserted, in a radial direction of the filter element, in a through-hole provided in the tubular portion.

6. The filter device according to claim 5, wherein the IC tag has a substantially hollow circular plate shape, and
the IC tag has an inner diameter greater than an inner diameter of the filter medium.

7. The filter device according to claim 5, wherein the IC tag has a substantially circular plate shape, and
the filter element is provided so that the IC tag and the antenna are linearly arranged.

* * * * *